United States Patent [19]

Chow et al.

[11] Patent Number: 5,038,333
[45] Date of Patent: Aug. 6, 1991

[54] POSITIONING SYSTEMS INCLUDING RELIABLE TRACK CROSSING DETECTION FOR HIGH SPEED RELATIVE MOTIONS

[75] Inventors: William W. Chow; Alan A. Fennema; Benjamin C. Fiorino; Ian E. Henderson; Ronald J. Kadlec; Spencer D. Roberts, all of Tucson, Ariz.

[73] Assignee: International Business Machines Corporation, Armonk, N.Y.

[21] Appl. No.: 347,639

[22] Filed: May 5, 1989

[51] Int. Cl.$^5$ .................. G11B 7/09; G11B 21/08
[52] U.S. Cl. ..................... 369/44.28; 369/44.27; 369/44.29; 360/78.07
[58] Field of Search ............ 360/78.07, 78.08, 78.09, 360/77.04; 369/44.27, 44.28, 44.29, 32, 44.11

[56] References Cited

U.S. PATENT DOCUMENTS

| | | | |
|---|---|---|---|
| 3,997,876 | 12/1976 | Frush | 340/172.5 |
| 4,133,011 | 1/1979 | Kurzweil, Jr. | 360/78.09 |
| 4,135,217 | 1/1979 | Jacques et al. | 360/77.04 |
| 4,406,000 | 9/1983 | Shoji et al. | 369/44 |
| 4,414,655 | 11/1983 | Shoji et al. | 369/44 |
| 4,587,644 | 6/1986 | Fujiie | 369/44 |
| 4,593,386 | 6/1986 | Kuwahara | 369/46 |
| 4,688,202 | 8/1987 | Mukai et al. | 369/44 |
| 4,839,876 | 6/1989 | Fennema | 369/44.29 |
| 4,876,679 | 10/1989 | Mukai | 369/44.29 |
| 4,899,234 | 2/1990 | Genheimer | 360/78.06 |
| 4,901,299 | 2/1990 | Nakatsu | 369/32 |
| 4,967,404 | 10/1990 | Orlicki et al. | 369/44.11 |

OTHER PUBLICATIONS

Hanson et al, "Disc File Defect Screening System", IBM Technical Disclosure Bulletin, vol. 17, No. 2, Jul. 1974, pp. 495-497.

Primary Examiner—Roy N. Envall, Jr.
Assistant Examiner—Hindi Nabil
Attorney, Agent, or Firm—H. F. Somermeyer

[57] ABSTRACT

A track-seeking apparatus of a disk recorder employs a track-crossing sensor to produce track-crossing signals. An oscillator is slaved to the sensor for supplying substitute track-crossing pulses in the absence of the sensor providing such pulses or when the radial velocity exceeds a threshold velocity. A velocity profile means alters the oscillator frequency so that the oscillator produces track-crossing pulses in accordance with the profile.

15 Claims, 6 Drawing Sheets

POSITIONING SYSTEMS INCLUDING RELIABLE TRACK CROSSING DETECTION FOR HIGH SPEED RELATIVE MOTIONS

BACKGROUND OF THE INVENTION

Disk recorders of either the magnetic or optical type employ transducer positioning systems. Such positioning systems often use a so-called velocity servo loop for long transducer motions, termed seeks. Such long transducer motions cause a sensing transducer to traverse a large number of concentric circular record tracks on the disk record member. The velocity positioning servo loop is optimally switched to a track-following position servo mode at a one-quarter track pitch distance from a target track. Such a track following control may be favorably compared to "Stop-Lock" positioning control in other servo positioning applications. Upon reaching the target track, the track-following position servo positions the transducer to faithfully scan or follow the target track. In a subsequent seek operation, the track following position loop is interrupted to return to either a velocity loop, a second positioning loop or other form of seek positioning servo control. It has been observed that when inter-track spacing is reduced for obtaining higher track densities, then reliable track counting during a velocity seek becomes more acute. In particular, the so-called runout or eccentricity of rotation of the optical disk can cause false direction indications and false counting of tracks such that a target track is not faithfully reached. Accordingly, it is desired to provide for more reliable counting and control of the velocity servo during a seek operation in which a transducer transverses a plurality of tracks.

In a seek operation, because of the high track densities, any asperity in the record medium surface can cause a track not to be counted. Accordingly, it is desired to provide a system which obviates medium surface asperities from detracting from a successful track-seeking operation.

Many optical recorders have the goal of high performance at low cost. In some of these high performance optical recorders, a so-called fine servo or fine actuator (also termed a secondary head-arm) is carried on a primary transducer carrying-arm which is radially moved by a so-called coarse actuator. Typically, the fine actuator has high-frequency response characteristics and provides for rapid and short distance positioning of the transducer with respect to a track being followed or for moving from one track to a second or target track. The coarse servo, which positions the relatively large mass primary or head-carrying head-arm, typically has low-frequency characteristics for handling the longer moves. For optimizing the relationship for top performance between the fine and coarse actuators, servo systems also provide for relative positioning of the fine actuator with respect to the coarse actuator to a central or reference position. Such arrangements have been colloquially called "piggy-back" carriage servo systems. All of the above shows that the need for reliable track counting becomes more acute.

FIELD OF THE INVENTION

The present invention relates to position control systems; more particularly, it relates to those position control systems having reliable track counting apparatus and methods.

DISCUSSION OF PRIOR ART

The application of such a piggy-back carriage system is not limited to disk recorders. Actually, the concept was established many years ago for a pattern-following or template-controlled, coarse-fine positioning servo mechanism. See Gardiner U.S. Pat. No. 2,717,979. Such an arrangement enabled higher production rates of a pattern-controlled machine, such as a welding or cutting machine. The carried fine or secondary actuator rapidly responds to sharp changes in the pattern, such that the welding or cutting operation faithfully follows the guiding pattern template while overcoming only minimal inertia of the pattern-control machine mechanisms. Gardiner teaches that the fine actuator, which Gardiner terms a topping servo, is to be controlled by the absolute positioning of the pattern template, while the coarse servo (Gardiner's main servo) is slaved or always follows positioning motions of the topping (fine) servo. Such an arrangement means that the rapidly responding topping (fine) servo controls the pattern-control machine, while the main (coarse) servo follows the motions of the topping (fine) servo for maintaining the topping (fine) servo in an optimal position with respect to the main (coarse) servo-controlled carriage; this arrangement can maximize the range of operation of the topping (fine) servo. This type of servo arrangement is also shown in Meyer U.S. Pat. No. 4,627,029.

McIntosh et al., U.S. Pat. No. 3,924,268 and Merrit et al. U.S. Pat. No. 4,513,332 show magnetic disk recorders having piggy-back, head-positioning arrangements which are servo-position controlled for optimizing the relative position of the fine actuator with respect to a coarse actuator. Simmons U.S. Pat. No. 3,924,063 shows yet another coarse-fine control, wherein the fine actuator is permitted to move over a predetermined minimal distance before a coarse actuator operation is invoked. van Winkle U.S. Pat. No. 4,191,981 shows fast and slow servo-positioning mechanism in a multiple magnetic disk recorder in which the slow servo mechanism is slaved to a fast servo mechanism. The latter arrangement is not a piggy-back arrangement in a true sense.

Another problem in track seeking is the reliable track counting during the seek to ensure access to a target track upon the first try. Defect accommodation or avoidance has been practiced in the magnetic disk recorders for a long time. For example Shoji et al. in U.S. Pat. Nos. 4,406,000 and 4,414,655 show defect accommodation during a track following operation. Both of these references show employing the current value of the track-following control signal for maintaining the track following relationship while traversing a defect in the track. In fact the time out timer is used to determine the maximal length of time corresponding to the size of the defect. This accommodation does not suggest how to accommodate loss of track counts during a high-speed, track-seek operation. Fujiie in U.S. Pat. No. 4,587,644 shows reducing track-following servo loop gain during occurrence of defects of the track being scanned.

Another problem in track seeking is the eccentricity or run out problem. When the track-seek operation is relatively slow with respect to the rotational or lineal speed of the track being crossed, then the runout may occur while the radial motion is less than one track width. To assist in accommodating such runout, the eccentricity is measured and stored in a table, then the stored values are fed into the positioning servo such that the positioning servo tends to follow the eccentricity. Such a runout compensator is shown by Jacques et al., in U.S. Pat. No. 4,135,217. Another technique for accommodating the runout condition is shown by Sordello in U.S. Pat. No. 3,458,785. Sordello teaches that generating a quadrature signal within a pattern recorded on the disk provides direction-indicating information. For example, a first signal is generated which is alternating in accordance with the rapidity of the seek. A second signal generated from a second transducer scanning a second signal portion on the disk surface provides a second alternating signal with 90 degrees phase change or quadrature, which unambiguously provides for direction indication. While the Sordello technique provides a satisfactory system, it is expensive to implement; in fact, the Sordello system is implemented in those disk recorders having a dedicated servo surface. Having the quadrature signal recorded thereon is used to guide a so-called comb-head supporting transducer for data recording and reading on a plurality of co-rotating disks. It is desired to avoid separate quadrature patterns on a record surface.

Accordingly it is desired to provide for more faithful tracking counting which therefore enables more faithful track counting and seeking operations.

SUMMARY OF THE INVENTION

It is an object of the present invention to provide an improved positioning system having enhanced track counting and accommodation of defects during track seeking operations.

In an optical disk recorder, or other positioning mechanisms, closely-spaced-apart, position-indicating, machine-sensible indicia are sensed and counted. The relative movement is divided into first and second predetermined portions; such portions can be interleaved as will become apparent. During a first predetermined portion, signals directly derived from sensed indicia are supplied as indicia signals to a motive means for controlling a relative motion. A timed circuit, such as a variable-frequency oscillator (VFO), phase-lock loop (PLL), other resonant circuit or oscillating circuits including (astable multi-vibrators) are slaved to the indicia signals for generating timed signals. During a second predetermined portion of the relative movement, the timed signals are substituted for the indicia signals for controlling the motor means.

In another aspect of the invention, whenever the speed during relative motion exceeds a predetermined reference value, then the second predetermined portion is declared. During the second predetermined portion, the timed signals are used for controlling the motor means to the exclusion of the sensed indicia signals.

The foregoing and other objects, features, and advantages of the invention will be apparent from the following more particular description of preferred embodiment of the invention, as illustrated in the accompanying drawings.

DETAILED DESCRIPTION

Figure 1:
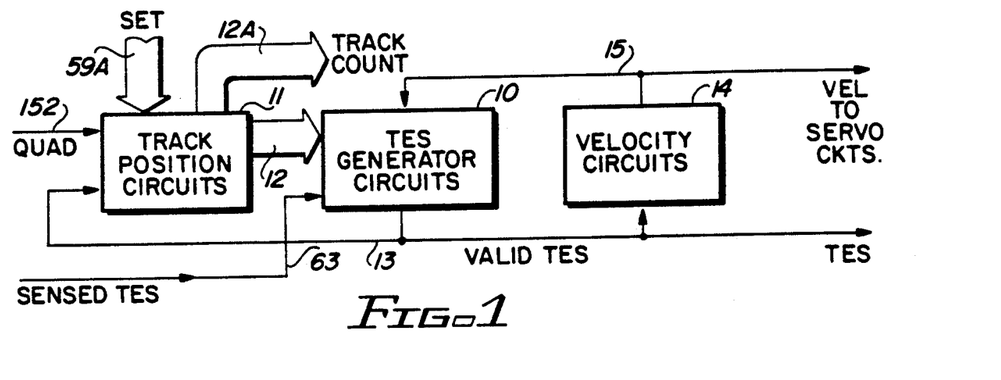
FIG. 1 is a simplified and abbreviated showing of a position and velocity detection circuits constructed in accordance with the present invention.

Referring now more particularly to the appended drawing, like numerals indicate like structural parts and features in the various figures. TES generator circuits 10 respond jointly to a sensed TES supplied over line 63, as later described, and to a track count of distance to go supplied by track position circuit 11 received over bus 12 to supply a corrected or valid TES signal over line 13. The valid TES signal more faithfully indicates track crossings than the indicia signal. The valid TES signal on line 13 travels to track position circuits 11 for effecting reliable track counting. A set of velocity circuits 14 respond to the valid TES signal on line 13 to generate a true velocity signal on line 15 for servo circuits for controlling the motive means, as later described. The line 15 velocity signal also travels to TES generator circuits 10 for more validly producing a valid TES signal. The actual track count to go is supplied not only over cable 12 but over cable 12A for use in other parts of the servo circuits. At the beginning of each seek, the value received over bus 59A is stored in the track position circuits 11 to represent a predetermined number of tracks to go (this value can be the number of tracks times two).

TES generator circuits 10 include a timed electrical circuit for generating a valid TES signal which is used during predetermined portions of the relative motion controlled by the positioning systems. At other times the sensed TES signal supplied over line 63 is passed as an indicia signal through TES generator circuits 10 to become the valid TES signal on line 13.

Figure 2:
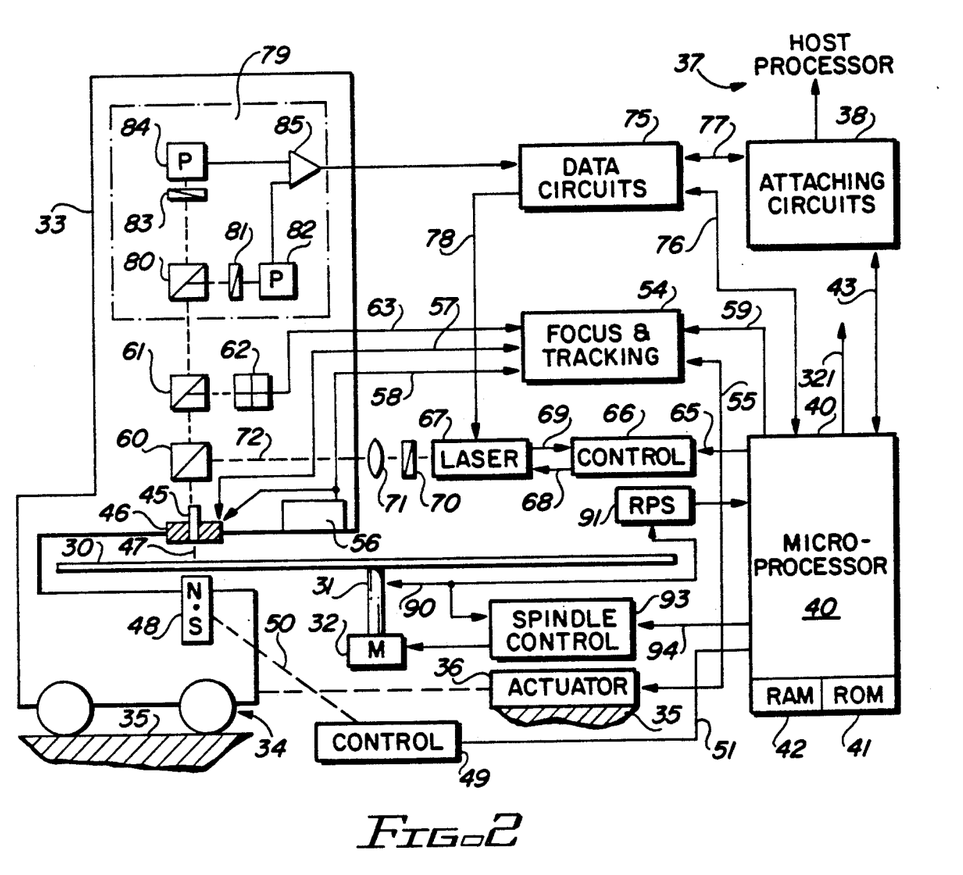
FIG. 2 is a simplified block diagram of an optical disk recorder/player with which the servo system shown in FIG. 1 may be advantageously employed.

An optical recorder with which the present invention may be advantageously employed is shown in FIG. 2. A magnetooptic record disk 30 is mounted on spindle 31 for rotation by motor 32. Optical head-carrying arm 33 on head-arm carriage generally denoted by numeral 34, moves radially of disk 30. A frame 35 of recorder suitably mounts carriage 34 for reciprocating radial motions. The radial motions of carriage 34 enable access to any one of a plurality of concentric tracks or circumvolutions of a spiral track for recording and recovering data on and from the disk. Linear actuator 36 suitably mounted on frame 35, radially moves carriage 34 for enabling track accessing. The recorder is suitably attached to one or more host processors 37, such host processors may be control units, personal computers, large system computers, communication systems, image process processors, and the like. Attaching circuits 38 provide the logical and electrical connections between the optical recorder and the attaching host processors 37.

Microprocessor 40 controls the recorder including the attachment to the host processor 37. Control data, status data, commands and the like are exchanged between attaching circuits 38 and microprocessor 40 via bidirectional bus 43. Included in microprocessor 40 is a program or microcode-storing, read-only memory (ROM) 41 and a data and control signal storing random access memory (RAM) 42.

The optics of the recorder include an objective or focussing lens 45 mounted for focussing and tracking motions on head-arm 33 by fine actuator 46. This actuator includes mechanisms for moving lens 45 toward and away from disk 30 for focussing and for radial movements parallel to carriage 34 motions; for example, for changing tracks within a range of 100 tracks so that carriage 34 need not be actuated each time a track adjacent to a track currently being accessed is to be accessed. Numeral 47 denotes a two-way light path between lens 45 and disk 30.

In magnetooptic recording, magnet 48 (in a constructed embodiment magnet 48 is an electromagnet) provides a weak magnetic steering field for directing the remnant magnetization direction of a small spot on disk 30 illuminated by laser light from lens 45. The laser light spot heats the illuminated spot on the record disk to a temperature above the Curie point of the magnetooptic layer (not shown, but can be an alloy of rare earth and transitional metals as taught by Chaudhari et al., U.S. Pat. No. 3,949,387). This heating enables magnet 48 to direct the remnant magnetization to a desired direction of magnetization as the spot cools below the Curie point temperature. Magnet 48 is shown as oriented in the "write" direction, i.e., binary ones recorded on disk 30 normally are "north pole remnant magnetization". To erase disk 30, magnet 48 rotates so the south pole is adjacent disk 30. Magnet 48 control 49, which is mechanically coupled to rotatable magnet 48 as indicated by dashed line 50, controls the write and erase directions. Microprocessor 40 supplies control signals over line 51 to control 49 for effecting reversal of the recording direction.

It is necessary to control the radial position of the beam following path 47, such that a track or circumvolution is faithfully followed and that a desired track or circumvolution is quickly and precisely accessed. To this end, focus and tracking circuits 54 control both the coarse actuator 36 and fine actuator 46. The positioning of carriage 34 by actuator 36 is precisely controlled by control signals supplied by circuits 54 over line 55 to actuator 36. Additionally, circuits 54 control signals travel over lines 57 and 58, respectively, for focus and fine tracking and switching actions of fine actuator 46. Lines 57 and 58 carry position controlling signals from focus and tracking circuits 54 to actuator 46. Sensor 56 senses the relative position of fine actuator 46 to head-arm carriage 33.

The focus and tracking position sensing is achieved by analyzing laser light reflected from disk 30 over path 47, thence through lens 45, through one-half mirror 60 and to be reflected by half-mirror 61 to a so-called "quad detector" 62. Quad detector 62 has four photo elements which respectively supply signals on four lines collectively denominated by numeral 63 to focus and tracking circuits 54. Aligning one axis of the detector 62 with a track center line, track following operations are enabled. Focussing operations are achieved by comparing the light intensities detected by the four photo elements in the quad detector 62. Focus and tracking circuits 54 analyze the signals on lines 63 to control both focus and tracking.

Recording or writing data onto disk 30 is next described. It is assumed that magnet 48 is rotated to the desired position for recording data. Microprocessor 40 supplies a control signal over line 65 to laser control 66 for indicating that a recording operation is to ensue. This means that laser 67 is energized by control 66 to emit a high-intensity, laser light beam for recording; in contrast, for reading, the laser 67 emitted laser light beam is a reduced intensity for not heating the laser illuminated spot on disk 30 above the Curie point. Control 66 supplies its control signal over line 68 to laser 67 and receives a feedback signal over line 69 indicating the laser 67 emitted light intensity. Control 68 adjusts the light intensity to the desired value. Laser 67, a semiconductor laser such as a gallium arsenide diode laser, can be modulated by data signals so the emitted light beam represents the data to be recorded by intensity modulation. In this regard, data circuits 75 (later described) supply data-indicating signals over line 78 to laser 67 for effecting such modulation. This modulated light beam passes through polarizer 70 (linearly polarizing the beam), thence through collimating lens 71 toward half mirror 60 for being reflected toward disk 30 through lens 45. Data circuits 75 are prepared for recording by the microprocessor 40 supplied control signals over line 76. Microprocessor 40 in preparing circuits 75 is responding to commands for recording received from a host processor 37 via attaching circuits 38. Once data circuits 75 are prepared, data is transferred directly between host processor 37 to data circuits 75 through attaching circuits 38. Data circuits 75 also includes ancillary circuits (not shown) relating to disk 30 format signals, error detection and correction and the like. Circuits 75, during a read or recovery action, strip the ancillary signals from the readback signals before supplying corrected data signals over bus 77 to host processor 37 via attaching to 38.

Reading or recovering data from disk 30 for transmission to a host processor requires optical and electrical processing of the laser light beam from the disk 30. That portion of the reflected light (which has its linear polarization from polarizer 70 rotated by disk 30 recording using the Kerr effect) travels along the two-way light path 47, through lens 45 and half-mirrors 60 and 61 to the data detection portion 79 of the head-arm 33 optics. Half-mirror or beam splitter 80 divides the reflected beam into two equal intensity beams both having the same reflected rotated linear polarization. The half-mirror 80 reflected light travels through a first polarizer 81, which is set to pass only that reflected light which was rotated when the remnant magnetization on disk 30 spot being accessed has a "north" or binary one indication. This passed light impinges on photo cell 82 for supplying a suitable indicating signal to differential amplifier 85. When the reflected light was rotated by a "south" or erased pole direction remnant magnetization, then polarizer 81 passes no or very little light resulting in no active signal being supplied by photocell 82. The opposite operation occurs by polarizer 83 which passes only "south" rotated laser light beam to photo cell 84. Photocell 84 supplies its signal indicating its received laser light to the second input of differential amplifier 85. The amplifier 85 supplies the resulting difference signal (data representing) to data circuits 75 for detection. The detected signals include not only data that is recorded but also all of the so-called ancillary signals as well. The term "data" as used herein is intended to include any and all information-bearing signals, preferably of the digital or discrete value type.

The rotational position and rotational speed of spindle 31 is sensed by a suitable tachometer or emitter sensor 90. Sensor 90, preferably of the optical sensing type that senses dark and light spots on a tachometer wheel (not shown) of spindle 31, supplies the "tach" signals (digital signals) to RPS circuit 91 which detects the rotational position of spindle 31 and supplies rotational information-bearing signals to microprocessor 40. Microprocessor 40 employs such rotational signals for controlling access to data storing segments on disk 30 as is widely practiced in the magnetic data storing disks. Additionally, the sensor 90 signals also travel to spindle speed control circuits 93 for controlling motor 32 to rotate spindle 31 at a constant rotational speed. Control 93 may include a crystal controlled oscillator for controlling motor 32 speed, as is well known. Microprocessor 40 supplies control signals over line 94 to control 93 in the usual manner.

Figure 3:
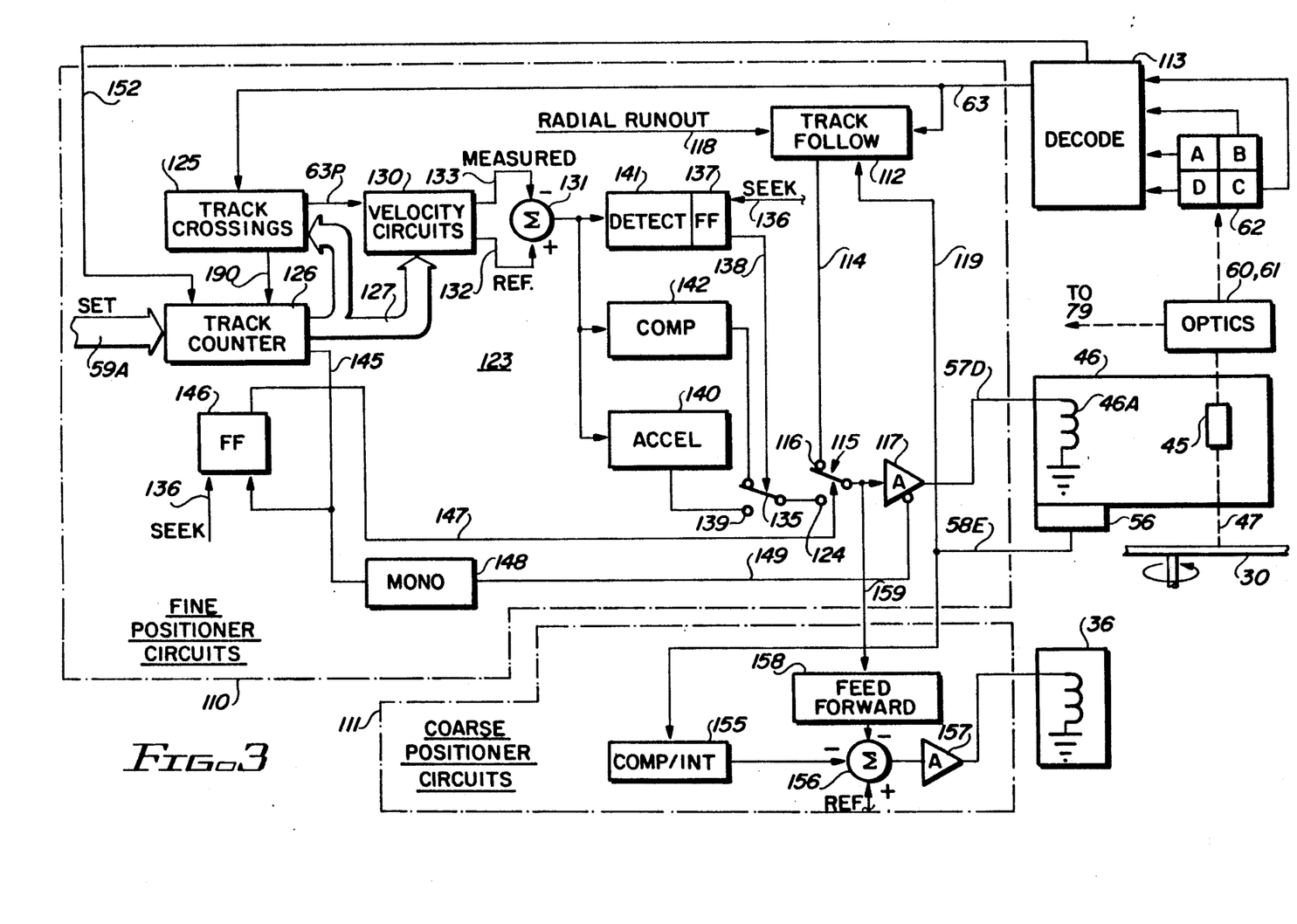
FIG. 3 is a diagram showing the track-positioning portion of the tracking and focusing circuits of FIG. 2.

FIG. 3 illustrates the seeking and track following portions of focus and tracking circuits 54. The tracking and seeking portions include fine actuator 46 positioning circuits 110 and coarse positioner 36 servo circuits 111. The coarse positioner circuits 111 operate such that the coarse actuator 36 always moves the head-arm to follow the motions of fine actuator 46. Fine positioner circuits 110 actuate actuator 46 to move objective lens 45 such that a laser beam traveling along light path 47 scans a single track during track following operations and moves radially across the disk 30 for crossing the tracks during a track seek operation. For track following operations track follow circuit 112 receives a sensed tracking error signal over line 63 from decoder 113 to provide track-following control signals over line 114. The line 114 control signal then traverses electronic switch 115, entering at track follow terminal 116, for controlling power output amplifier 117. Power amplifier 117 supplies an actuating signal over line 57D to actuator coil 46A of fine actuator 46. The drive current on line 57D causes the actuator 46 to move radially along the head-arm 33 for maintaining the position of the light beam 47 on a single track.

The quad detector 62 having independent photoresponsive elements A, B, C and D, arranged in a rectangular array, provide tracking error indicating photo element signals to decode circuit 113. The axis of the rectangle of quad detector 62 lying between photoelements A, B and D, C is aligned with the axis of the track being followed. Decode circuit 113 responds to the four photoelement signals to provide a tracking error signal, as is well known and as later described herein. In track follow circuit 112, the tracking error signal actuates servo circuits in a known manner. Operation of track follow circuit 112 is modified by a radial runout input received over line 118. A disk profile is generated for the disk 30 which indicates that the expected radial runout. Track follow circuits 112 respond to the radial runout signal for modifying the tracking error signal to anticipate the radial run out thereby providing more faithful track following. Additionally, relative position error sensor 56 mounted on head-arm 33 of carriage 34 senses relative displacement of actuator 46 and head-arm 33. It supplies a relative displacement error signal RPE over line 58E, thence line 119, to track follow circuits 112 for compensating for modifying the TES offset. Such offset is caused by relative motion between carriage 33 and fine actuator 46. This relative motion is detected by sensor 56 and indicated as the RPE signal which is fed forward to track following circuits 112. Velocity seek loop circuits, generally denoted by numeral 123, constitute all of the electronic circuits providing a signal to the seek input terminal 124 of seek-follow switch 115. Whenever a seek is instituted by microprocessor 40, electronic switch 115 is moved from terminal 116 to terminal 124 for disconnecting the track follow circuit 112 from amplifier 117 and connecting the velocity servo loops circuits 123 to amplifier 117.

Circuits 123 respond to several input signals for effecting the velocity-controlled seek. Track crossing circuit 125 receives the sensed TES signal over line 63 for detecting when the beam 47 is crossing a track on disk 30. Each time a track crossing is detected by circuit 125, an output decrementing pulse is supplied to track counter 126 for decrementing one from the number of tracks to go. It may be noted that in some embodiments a single track crossing is represented by two zero crossings of the tracking error signal on line 63. In some embodiments two pulses are provided to the track counter for indicating a single track crossing. At the time microprocessor actuates circuits 123 to do a seek, the microprocessor 40 supplies the number of tracks to be crossed over but 59A (part of line 59 of FIG. 2) presetting track counter 126 for the upcoming seek operation. Track counter 126 continuously outputs the number of tracks-to-go over bus 127 to velocity circuits 130 as well as to track crossing circuits 125. The track crossing circuits 125 use the track count for verifying accuracy of the number of tracks counted. Velocity circuits 130 respond to a velocity profile designed for the seek operation for generating a reference signal and a measured speed indicating signal. The speed reference signal supplied over line 132 is based upon the velocity profile desired for the seek operation and the instant distance to go. The measured speed signal is supplied over line 133 to be subtracted from reference signal on line 132 by sum circuit 131. The resultant speed error signal supplied by sum circuit 131 alters the operation of fine actuator 46 to closely follow the velocity profile. Operation of velocity circuits 130 are described later.

Circuits 123 also include a gain control circuit which includes gain control switch 135 having its output terminal connected to the seek terminal 124 of switch 115. Switch 135 is actuated to an acceleration position 139 whenever microprocessor 40 supplies a SEEK signal over line 136 (line 136 is shown as two different line portions in FIG. 3 for purposes of simplifying the drawing). The SEEK signal sets flip-flop FF 137 to the inactive state causing FF 137 to supply a switch actuating signal over line 138 to move switch 135 to connect acceleration terminal 139 to seek terminal 124 of switch 115. Acceleration circuit ACCEL 140 provides high gain to the sum circuit 131 error signal; that is, the error signal is accentuated by ACCEL circuit 140 for initially maximizing the drive power to actuator 46. This acceleration high gain portion minimizes the time it takes the fine actuator 46 to move beam 47 to a speed or velocity corresponding to the desired velocity profile. Once the velocity profile and the actual velocity are the same, then detector circuit 141 detects a small error signal supplied by sum circuit 131. At this time, detector circuit 141 resets FF 137 to the active state for supplying an activating signal over line 138 for switching switch 135 from terminal 139 to receive signals now from seek compensator circuit COMP 142. Compensator circuit 142 is designed to maximize velocity servo operation whenever the reference velocity profile and the measured velocity have a small error condition. Compensator 142 continues to couple sum circuit 131 through switch 135 to fine actuator 46 until the end of the seek, which occurs at one-quarter track pitch from the target track. At this point, track follow circuit 112 is again re-energized and the velocity circuits 123 are disconnected from actuator 46.

Track capture, i.e., switching from track seeking to track following on the target track, is indicated by track counter 126 one-quarter track pulse supplied over line 145, resets seek priming flip-flop 146 to the reset state. Initially the SEEK signal from microprocessor 40 on line 136 set FF 146 to the active state causing switch 115 to move from follow terminal 116 to seek terminal 124. Resetting FF 146 at one-quarter track pitch-to-go from the target track causes a deactivating signal to be supplied over line 147 for moving the switch 115 from seek terminal 124 back to the follow terminal 116.

To assist in track capture, the dynamic range of power amplifier 117 is momentarily increased for supplying a maximal control signal over line 57D to actuator coil 46A. This additional control current ensures fast capture but is not desired for faithful track following operations. Accordingly, the one-quarter track pitch signal on line 145 actuates a monostable multivibrator, or other time delay circuit MONO 148, to supply an actuating signal over line 149 to amplifier 117. This actuating signal causes the amplifier 117 dynamic range to be increased, electronically changing the dynamic range of amplifiers as is well known and not further described for that reason.

It may be desired to verify that track counter 126 has faithfully counted the tracks, particularly when two pulses per track crossing are employed. To this end, decode circuit 113 supplies a signal which is the sum of all photocurrents from the elements of detector 62 over line 152 to track counter 126. This sum signal is in quadrature to the TES signal on line 63. Whenever the sum signal on line 152 has a maximum positive amplitude, then the beam 47 is in the center of a track being crossed. When two pulses per track crossing are employed, this means that the numerical content of track counter 126 should be even. If the track counter is odd, then the track count is changed by unity for synchronizing the track count to actual track crossings. This paragraph completes the description of circuit 123.

The coarse positioner circuits 111 receive the relative position error signal RPE from detector 56 over line 58E. Compensator and integrator COMP/INT 155 responds to the error signal to supply a smoothed and integrated error signal to sum circuit 156. Sum circuit 156 compares the error signal from compensator integrator 155 with a reference signal for supplying a control signal through amplifier 157 causing actuator to move head-arm to follow the motions of actuator 46. Such following operations reduce the error signal sensed by detector 56 in the relative movement of the head-arm 33 (carriage 34) and actuator 46 away from a reference position on head-arm 33 (not shown). During seek operations, it is desired to actuate coarse actuator 36 from moving head-arm 33 more quickly for limiting the relative position between the fine and coarse actuators. To this end, the drive signal supplied to amplifier 117 for driving fine actuator 46 is also supplied over line 159 to feedforward circuit 158. Feedforward circuit 158 is basically a gain control and signal smoothing circuit of any design. Feedforward circuit circuit 158 supplies its output signal to sum circuit 156. The feedforward circuit 158 output signal is added by sum circuit 156 to the signal from element 155 for actuating actuator 36 to maximal actuation, particularly during acceleration mode. Thus, the fine servo loop during acceleration phase passes the effects of circuit 140 to the coarse servo loop. Accordingly, both the fine actuator 46 and the coarse actuator 36 receive enhanced drive signals during the acceleration phase for ensuring both actuators 36 and 46 accelerate in a minimal time according to the desired velocity profile.

Figure 4:
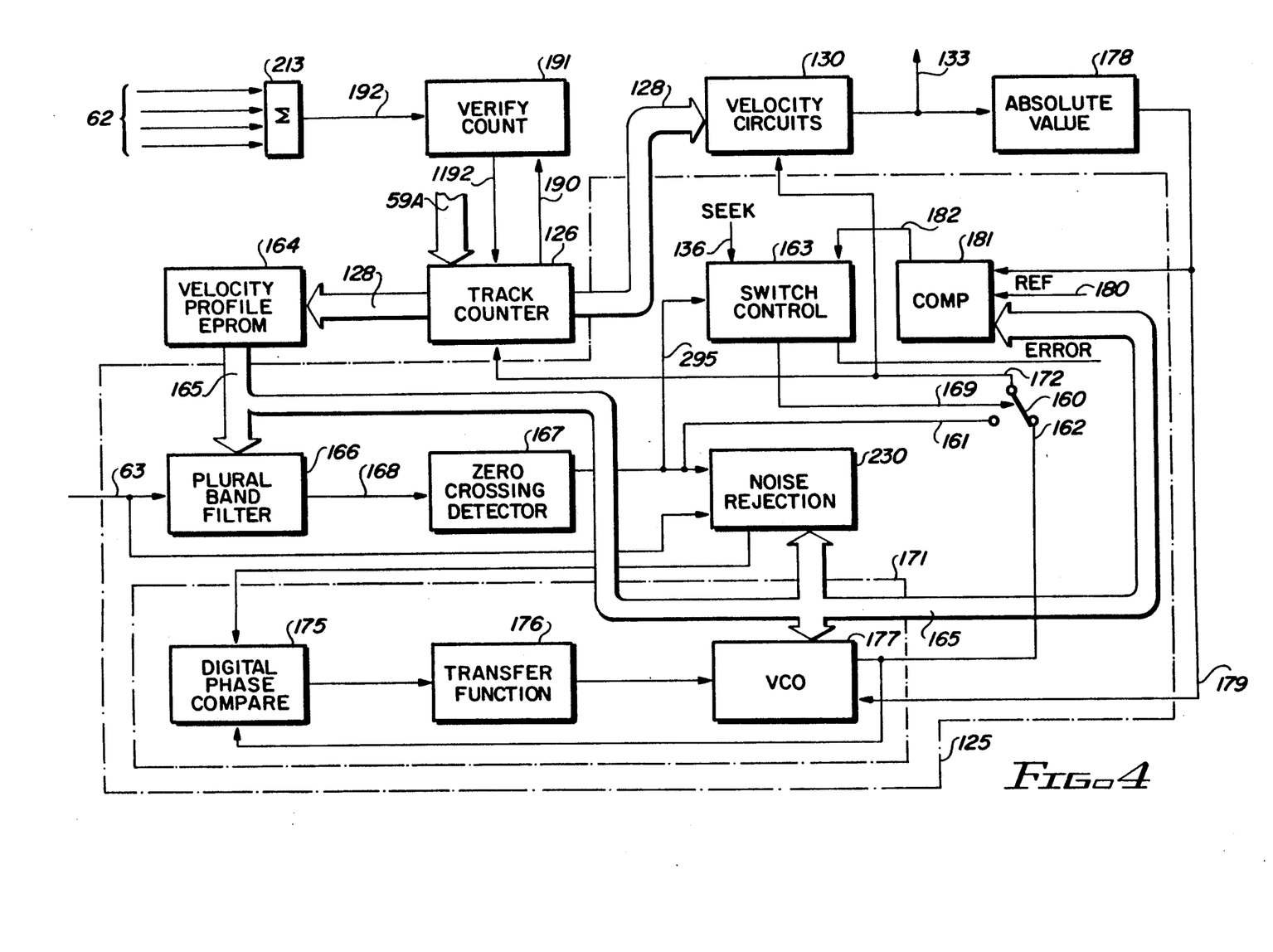
FIG. 4 shows a detail of the FIG. 1 illustration which is a portion of the velocity circuits shown in FIG. 3.

FIG. 4 is a block diagram showing the track crossing circuits 125, which accommodate defects or other error conditions during the track seeking operations. Electronic switch 160 selects either a processed sensed tracking error signal produced zero axis crossings received by switch 160 over line 161 or substitute zero axis crossing pulses received over line 162. Under certain operating conditions, the line 162 pulses provide more reliable indications of track crossings than the processed TES signal pulses. The substitute zero axis crossing pulses are supplied by a phase-lock loop (PLL) 171, which is phase synchronized to the processed TES pulses and frequency controlled in accordance with the current velocity of the beam 47 crossing the disk 30.

The processing of the received TES signal on line 63 into zero crossing pulses is first described. Plural band filter 166 band pass filters the line TES signal 207 (FIG. 6) in accordance with current velocity of the beam crossing disk 30. The current velocity, in the constructed embodiment, is the velocity profile of the seek. Such velocity profile is digitally stored in velocity profile EPROM 164 as a table of values. Track counter 126 supplies the number of tracks-to-go indication over bus 128 to EPROM 164 and to velocity circuits 130. The distance-to-go value actuates EPROM 164 to emit control signals over bus to select a pass band of plural band filter 166; for example, filter 166 may have eight pass bands, one of which is selected at any given instant. The higher the velocity, the higher frequency and width of the pass band selected to process the line 63 TES signal. The actual values and number of bands are best empirically determined. The pass band filtered TES signal travels over line 168 to zero axis crossing detector 167. Detector 167 emits a train of pulses 231 (FIG. 8) corresponding to, zero axis crossings of TES signal 207, to line 161, thence switch 160. At low frequencies of pulses 169, switch 160 passes the line 161 pulses as valid TES zero axis crossing pulses over line 172 for decrementing track counter 126 and as an input to velocity measuring circuits 130.

The substitute zero axis crossing pulses on line 162 are PLL 171 output pulses. PLL 171 has a low-frequency response characteristic, hence it does not respond to missing sensed TES pulses on line 161 to provide defect accommodation as will become apparent. PLL 171 has the usual construction of a digital phase portion 175 which receives noise rejection circuit 230 output pulses pulses for phase compares with the line 162 pulses. The phase error signal generated by phase compare portion 175 passes through the usual transfer function 176 to phase control voltage controlled oscillator (VCO) 177. The frequency of VCO 177 is controlled to represent the current velocity of the beam 47 crossing disk 30. In a test embodiment, the current velocity was derived from the measured velocity signal on line 133 or from the velocity signal from EPROM 164; both velocity-indicating signals, the measured or the reference, were fed forward to frequency control VCO 177. The line 133 measured velocity signal has positive and negative polarities, hence absolute value circuit 178 converts the bipolar velocity signal to a unipolar (absolute value) signal traveling over line 179 to frequency control VCO 177 to the current velocity. In the test embodiment, the bus 165 carried reference velocity signal was alternately supplied for frequency controlling VCO 177. In a commercial embodiment, either of the two velocity-indicating signals may be employed or the two signals may be averaged together for joint frequency control of VCO 177.

Switch control 163 actuates switch 160 to couple the PLL 171 to line 172 whenever the radial velocity of the beam 47 exceeds a predetermined threshold indicated by a reference signal on line 180. In the frequency domain, the threshold is the track crossing frequency. Compare circuit 181 compares the line 179 measured velocity signal with the line 180 reference signal. When the measured velocity signal amplitude exceeds the reference signal amplitude, then compare circuit supplies a high-speed indicating signal over line 182 to switch control circuit 163. Switch control circuit 163 responds to the high-speed indicating signal to actuate switch 160 to decouple line 161 from line 172 and to couple line 162 to line 172. When the line 179 measured velocity signal decreases to be less than the line 180 reference signal, then compare circuit 181 switch control 163 responds to the compare circuit to actuate switch 160 to recouple line 161 to line 172 for passing the processed sensed TES pulses as valid TES pulses.

Digital phase compare portion 175 produce phase error signal can indicate a loss of phase synchronization between the sensed TES pulses and the PLL 171 output pulses. Switch control 163 includes a phase error detector (not shown) operative during the high-speed portion of the seek for indicating a loss of synchronization; then switch control 163 actuates switch 160 to decouple line 162 from line 172 and recouple line 161 to line 172 for again passing the processed sensed TES pulses as valid TES pulses. Once a loss of phase synchronization is detected, then the PLL 171 output pulses are not used during a current seek.

It has been found that PLL 171 enables the seeking operation to continue in an accurate manner over medium defects extending over a relatively large number of tracks. While no TES pulses are being sensed, digital phase compare portion 175 did not indicate a loss-of-phase synchronization. The fed forward current velocity signal causes PLL 171 to velocity track the velocity profile such that when sensed TES pulses are again generated, the PLL 171 operation quickly regains phase synchronization for continuing the seek operation under its control. If phase synchronization is not reestablished, then the sensed TES pulses on line 161 are used to complete the seek operation. It has been found that PLL 171 enables seeking directly to a target track even when large defects are encountered during the seek.

It is well known that each track crossing is indicated by two zero crossings of the tracking error signal. Track counter 126 counts two such zero crossings for each track crossing. The center of a track is indicated by the numerical contents of track counter 126 having an even count. This even or odd count (the last or least significant digit of the counter) is supplied over line 190 to verify count circuit 191. Verify count circuit 191 receives the sum (quadrature) signal over line 192 for comparison with the odd-even count of track counter 126. If the count is odd, unity is subtracted from track counter 126 by a signal supplied from verify count circuit 191 over line 1192. This minor change synchronizes track counter portion 126 numerical contents to the actual position of beam 47.

Figure 5:
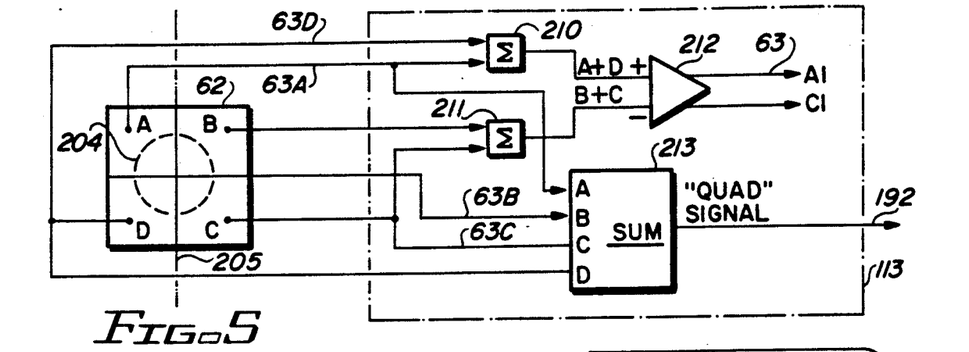
FIG. 5 is a simplified showing the generation of a tracking error signals (indicia signal and a quadrature signal).
Figure 6:
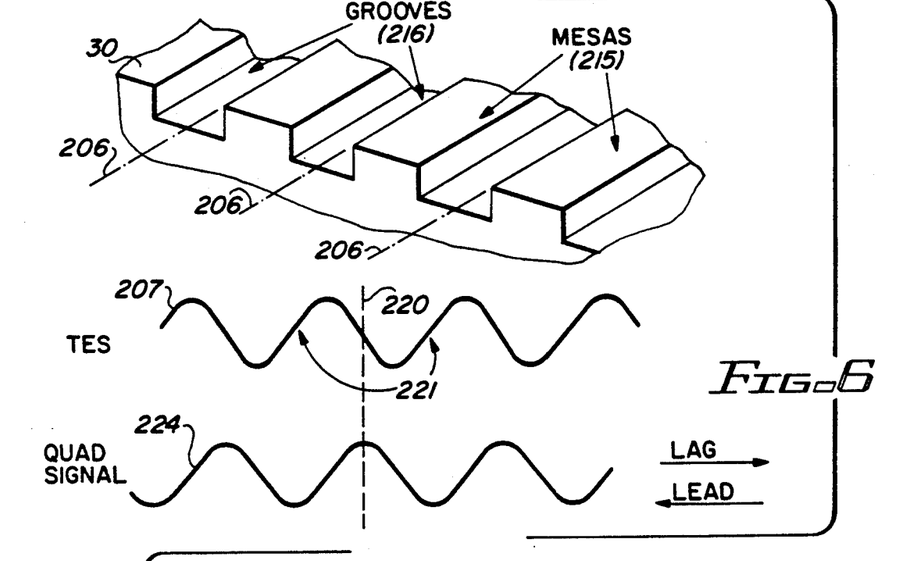
FIG. 6 spatially illustrates the relationship of tracks to the signals generated in FIG. 5.

FIG. 5 is a simplified diagram of the circuits employed for generating the TES and quad signals respectively over lines 63 and 192. The light beam reflected from disk 30, when in focus, impinges on the center of detector 62 as indicated by dash-lined circle 204. Such an indication indicates true track following and true focus. As the beam 47 goes off center from the track being followed, then the impingement of the beam 47 moves the circle 204 along an axis 205 of detector 62; axis 205 is aligned with the track center lines 206 (FIG. 6). All operations of decoder 113 are in analog signal form. TES signal 207 on line 63 is generated by two sum circuits 210, 211 and differential amplifier 212. Sum circuit 210 receives the sum of the photodetector elements A and D electrical currents, respectively over lines 63A and 63D, for summing same representing the total light received on one side of the axis 205 which corresponds to the physical position of beam 47 radially of the track being followed. Similarly, sum circuit 211 receives photocurrents from photoelements B and C, respectively over lines 63B and 63C for supplying a second sum signal representative of the light received relative to the track being followed. Differential amplifier 212 compares the sum signals from circuits 210 and 211 to generate the sensed TES signal 207 on line 63. Line 63 may be of the differential type wherein two signal lines carry the TES signal in differential form. Single-ended circuits may be employed as well. The quad signal on line 192, which is in quadrature to the sensed TES signal as will be explained with respect to FIG. 6, is generated by sum circuit 213. Sum circuit 213 receives photocurrents from all of the four elements A, B, C and D of detector 62, which provides a signal indicative of the total light received.

Referring next to FIG. 6, a portion of the information-bearing surface of disk 30 is illustrated. The disk is formed with two sets of concentric rings, one set being mesas 215 and the second set being grooves 216. Beam 47 impinges on the outer surface consisting of the interleaved grooves 216 and mesas 215. The track center lines 206 of the three tracks illustrated in FIG. 6, lie along the center of the grooves. At the point of light beam impingement on any track of disk 30, axis 205 is parallel to the respective track center lines 206. When the beam 47 is focused into a groove, the tracking error signal is at a zero crossing position 220, i.e., when exactly centered, the sensed TES signal should be at zero. As the beam moves radially from the track center line (crosswise) then the amplitude of the TES signal 207 changes as a sinusoid with the direction of change indicating the direction of tracking error. As the beam 47 scans transversely (radially) across the grooves or tracks, the TES signal takes the sinusoidal shape wherein zero axis crossings in a first direction signify crossing track center lines line 206 as indicated by dimension line 220. Similarly, when the beam is crossing the mesas 215, then the zero access crossing of TES signal 207 is in the opposite direction as at points 221. The quad signal 224 on line 192 is displaced 90 degrees from the TES signal 207. At the center of each track, quad signal 224 has a maximum positive amplitude (this applies to the illustrative embodiment only), the polarity of the signal may be inverted in other embodiments, whereas at the center of the mesas, a negative potential maximum is reached because of varying focus conditions, positive and negative magnitudes may be different. Examination of FIG. 6 readily shows the ninety degree or quadrature relationships between the sensed TES signal 207 and quad (sum) signal 224.

Figure 7:
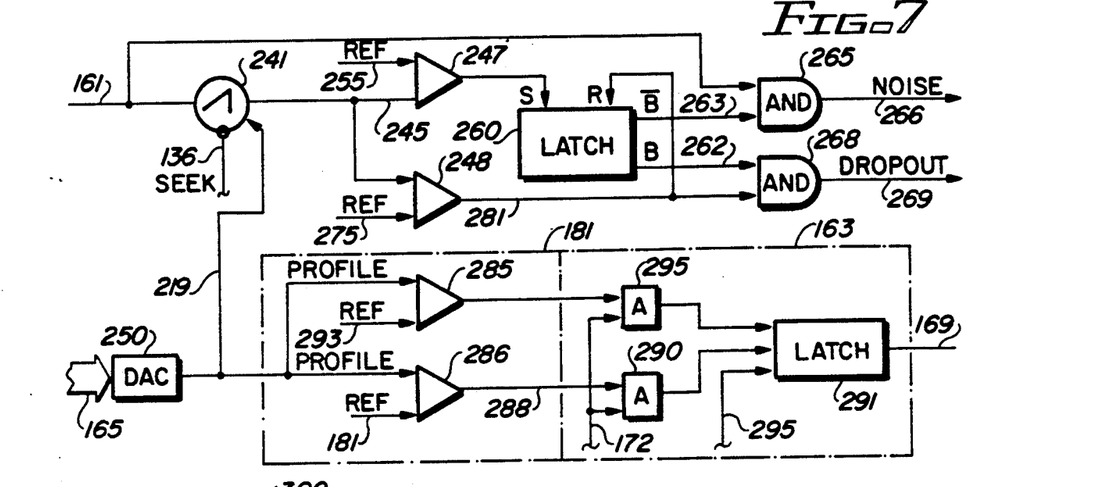
FIG. 7 is a detection window generations circuit usable in the FIG. 4-illustrated circuits as a noise rejection circuit.
Figure 8:
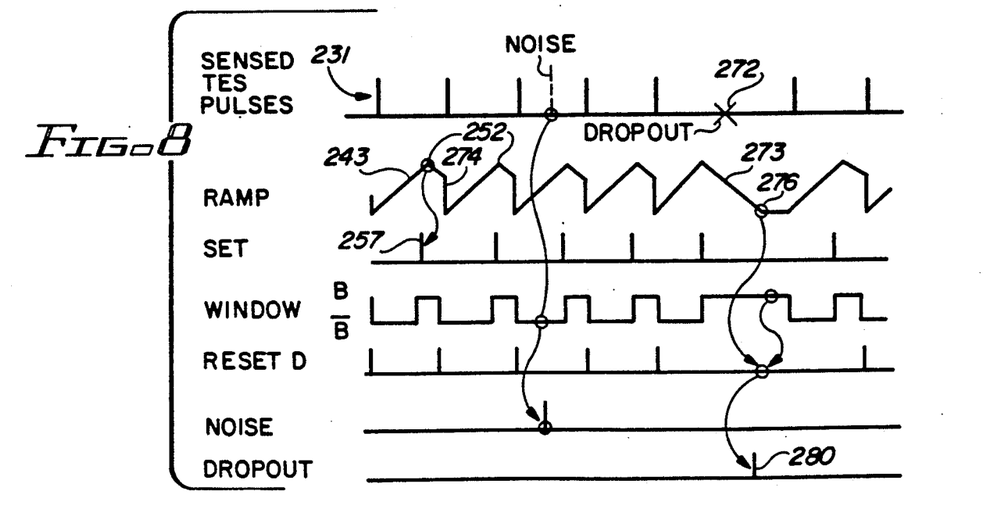
FIG. 8 is a simplified and idealized set of signal waveforms used for describing the operation of the FIG. 7-illustrated circuit.

Referring again to FIG. 4, a noise rejection circuit 230 may be interposed between line 161 and digital phase compare portion 175. FIGS. 7 and 8 illustrate such a noise rejection circuit and its operation. During a seek operation, sensed TES zero crossing pulses 231 traveling over line 161 (FIG. 4) actuate ramp generator 241. The seek operation is indicated by a seek signal received on line 136. Generator 241 outputs the ramp signal 243 over line 245 to a pair of comparators 247 and 248. The desired velocity profile indicating digital signals provided over cable 165 are converted to analog form by DAC 250. The desired profile is supplied to generator 241 for indicating the slope of the ramp 243. Comparator 247 compares the amplitude of ramp signal 243 with a reference signal supplied over line 255. When the ramp amplitude equals the reference signal amplitude on line 255, a set or priming pulse 257 is supplied by comparator 247 to set check latch 260 to the active condition; simultaneously, the set pulse S from comparator 247 triggers generator 241 to begin discharging, thereby identifying apex point 252.

A next succeeding sensed TES pulse 231 resets ramp generator 241 at point 274 returning ramp signal 243 to a reference amplitude. A new ramp cycle then begins. This action is the usual operation when sensed TES pulses 231 are being reliably generated.

Latch 260 supplies the B and B̄ signals detection defining windows respectively over lines 262 and 263. When latch 260 is in the reset condition, AND circuit 265 is enabled and it passes a sensed TES pulse on line 161 as noise over line 266. On the other hand, when latch 260 is set to the active condition, AND circuit 265 is disabled, while AND circuit 268 enabled to indicate a drop-out signal over line 269. The other input to AND gate 268 is generated by comparator 248. Comparator 248 determines when the discharging of ramp signal amplitude 243 falls below a certain reference signal value received on line 275, i.e., no sensed TES pulse 255 had reactivated ramp generator 241, to again begin a ramp signal. For example, a drop out of the sensed TES pulses occurred at point 272 of the sensed TES pulses. As a result, the ramp signal 243 is not reset at point 273 on the ramp signal 243. Instead ramp generator 241 continues to discharge until a threshold value indicated by the signal on line 275 is reached as indicated at 276. This point corresponds to comparator 248 supplying a drop-out pulse 280 over line 281 which resets latch 260. Drop-out pulse 280 also passes through AND circuit 268 to line 269. Lines 266 and 269 go to phase compare 175 for inhibiting its operation.

Switch control 163 is also partially illustrated. Whenever the current velocity profile exceeds a predetermined speed of the beam 47 laterally traversing the tracks, the PLL 171 pulses are selected as valid TES pulses, i.e., switch 160 is actuated by the line 169 signal. DAC 250 supplies the velocity profile analog signal of comparators 285 and 286 of compare circuit 181.

FIG. 7 also shows comparator 181 and a part of switch control 163. Comparator 286 compares the profile with a reference signal supplied from DAC 250 for indicating when the velocity of the beam is less than the predetermined value. The output signal of comparator 286 travels over line 288 to AND circuit 290. The valid TES pulses supplied over line 172 times the setting of switch 160 control latch 291. As long as latch 291 is set, no enabling signal is supplied over line 169 to switch 160 keeping line 161 coupled to line 172. On the other hand, when the velocity profile indicates a velocity greater than the predetermined value, comparator 285 determines that the profile value signal from DAC 250 is greater than the reference value signal on line 293. Then, comparator 285 enables AND circuit 295 to pass the valid TES pulses on line 172 to reset latch 291 thereby providing a continuous select PLL line 162 signal on line 169 keeping switch 160 in the illustrated setting. As soon as the profile is reduced to below the predetermined value, then latch 291 is again reset to the inactive condition by comparator 286. If a continuous phase sync loss signal from PLL 171 portion 175 is received over line 295, latch 291 stays in the reset state for the remainder of the seek.

Figure 9:
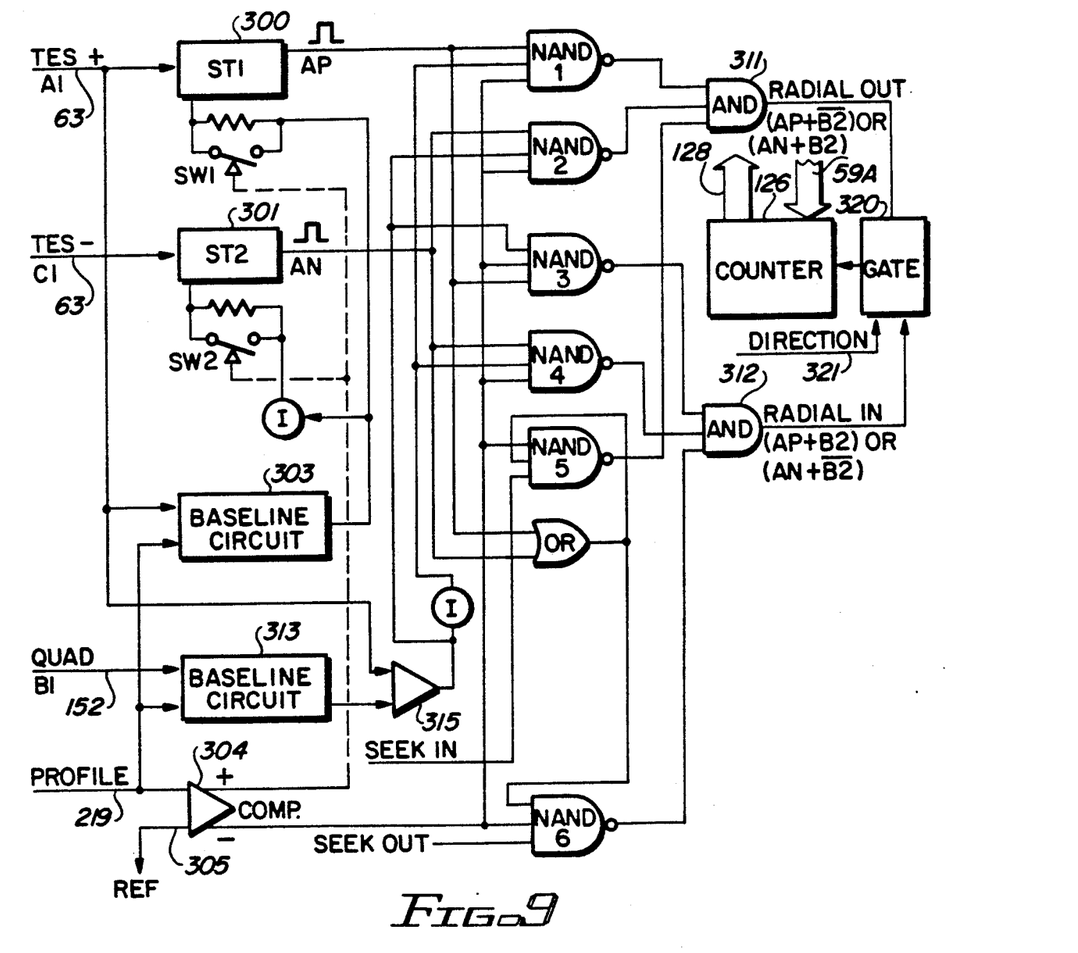
FIG. 9 shows a forward-reverse counting control for counting tracks in the FIG. 1-illustrated system, including verification of the track count.
Figure 10:
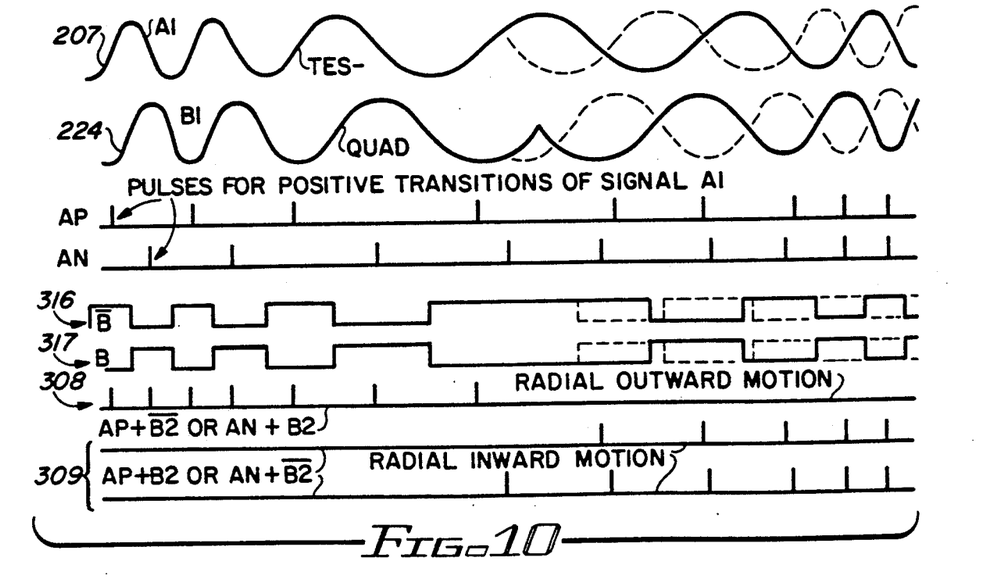
FIG. 10 shows a set of idealized signal waveforms used in connection with the description of operation of FIG. 9.

FIGS. 9 and 10 show a track-crossing indicating circuit which performs the function of verify count circuits 191 and supplies count input to a counter in track counter 126. The optical signals are retrieved from "quad" detector 62 as shown in FIG. 5. The differential tracking error signal (TES) on line 63 has a +TES signal A1 (FIG. 6) and a −TES signal C1 (FIG. 9); one signal being the complement of the other. The output signals of all four photo diodes A-D of detector 62 are scanned to create a sum or "quad" signal 224 (FIG. 10) having phase quadrature to TES signals A1 and C1. The quad and TES signals are combined to reliably detect track crossings with an indication of relative direction of radial motion of the beam 47 to disk 30.

The block diagram of FIG. 9 is described with respect to the signals shown in FIG. 10. The inputs A1, C1 are the TES signal 207 from differential amplifier 212 (FIG. 5). These inputs go to Schmitt triggers ST1 300 and ST2 301, respectively. The Schmitt triggers have switchable hysteresis levels. The switchable hysteresis levels eliminate "pick up" errors when track seeking at low radial velocities (hysteresis increased) and drop outs when seeking at high velocities (hysteresis decreased). The baseline tracking circuit (303) varies the reference level of the first Schmitt triggers 300 and 301. Circuit 303 is only operative at high seek velocities. A velocity detector 304 compares the desired velocity profile signal (a current velocity) on line 219 (DAC 250 of FIG. 7) with a reference value signal on line 305 and determines when to switch between different hysteresis levels of the Schmitt triggers and a variable reference level.

The quad signal 224 is used to detect retrograde motion during a seek operation. Retrograde motion may occur whenever disk runout is high or vibrations occur. The quad signal has a 90-degree phase lag with respect to the TES signal 207 when seeking radially inward versus a 90-degree phase lead when seeking radially outward. Output signals 308 and 309 respectively from AND 311 and AND 312 indicate track crossings in respective opposite radial directions, such as caused by a change in relative direction of motion of the beam and track during a seek. A change in direction causes pulses which appeared at one output switch to the other output. The quad signal 224 used to detect the occurrence of retrograde motion is only used when seeking at low velocities. Once the track crossing frequency is high, this circuit path is gated off.

Baseline tracking circuits 303 and 313, respectively, restore the baseline references for both the TES and quad signals. The positive peak amplitude level of the TES signal 207 activates one of the Schmitt triggers, ST1 or ST2, 300 or 301. Triggers ST1 and ST2 each have asymmetry which is accommodated by the complementary connections. The time duration each peak level is stored varies as a function of velocity (track-crossing frequency). The baseline reference voltages are connected to one leg of a comparator 315 (Schmitt trigger in the TES path). The other leg of the comparator receives the quad signal 224. The outputs of the comparator 315 are square wave $\overline{B}$ and b.

FIG. 10 shows two different runout conditions having retrograde motions. The solid line being one example and the dotted line being the other example. The signal designated as "A1" is the TES signal 207 and the one designated as "B1" is the quad signal 224. "AP" is defined as A1 pulse occurring each positive-sloped zero crossing of the TES and "AN" having pulses each time a negative zero crossing occurs. B2 and $\overline{B2}$ are the in-phase and out-of-phase digital track summing signals. The AND of AP+$\overline{B2}$, ORed with the AND of AN+B2 produces track-crossing pulse at output AND circuit 311 for indicating a radial outward motion of the beam. The AND of AP+B2 ORed with AND of AN+$\overline{B2}$ produces track-crossing pulses at output AND circuit 312 indicating a radial-inward motion of the beam.

In FIG. 9, gating logic 320 receives a direction signal from microprocessor 40 over line 321 which respectfully indicates the direction of commanded seek direction radially inward or radially outward. When a direction signal on line 321 indicates a radially-inward motion, then the radial impulses from AND circuit 311 are subtracted from the numerical contents of track counter 126 which indicates distance to go, while the radial-outward pulses from AND circuit 312 are added to the track counter 126 contents. In a similar manner, when the direction signal on line 321 indicates a radial-outward motion, the pulses from AND circuit 312 are subtracted from the contents of track counter 126, while the output pulses from AND circuit 311 are added to the track counter 126. Reading the illustrated logic for achieving this simple arrangement is well known. The output of AND circuits 311 and 312 represent the output signal of track-crossing circuit 125 which includes the illustrated NAND circuits and the illustrated Schmitt triggers and baseline circuits. The operation of NAND circuits is well known and the logic of operation can be determined from inspection of FIG. 9.

Figure 11:
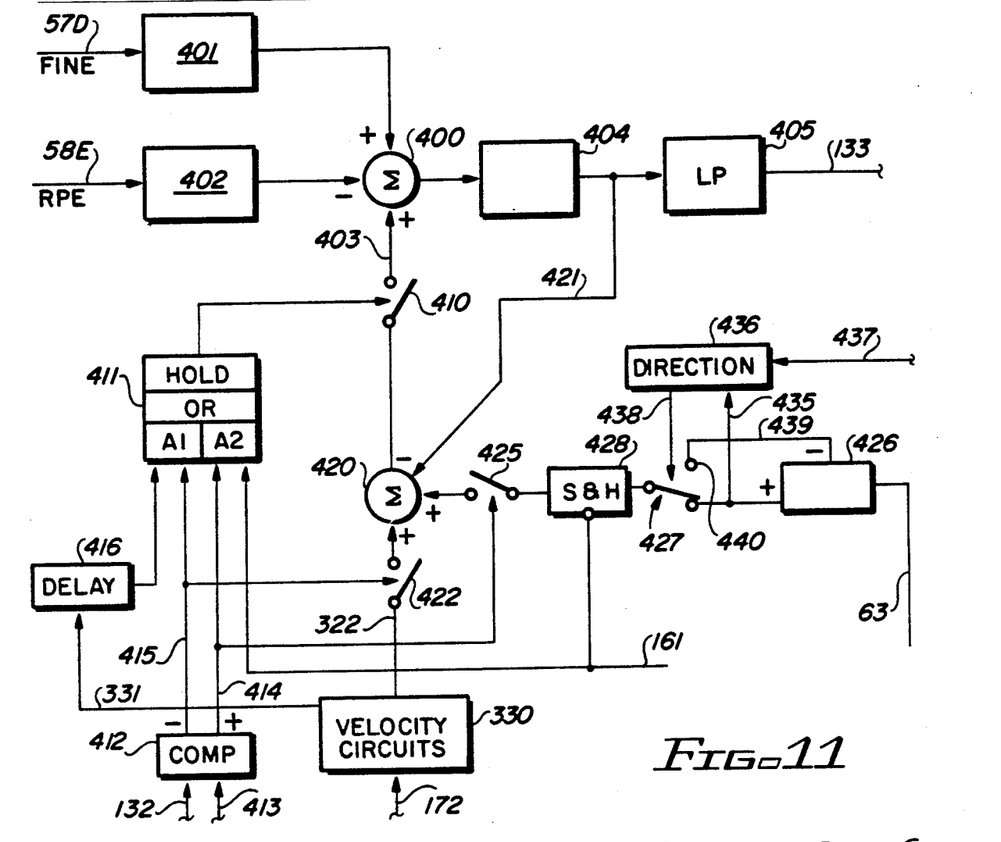
FIG. 11 shows a velocity signal smoothing circuit which enhances operation of the illustrated system.

Referring next to FIG. 11, the illustrated velocity-state estimator circuit is a preferred construction of velocity circuits 130 which smoothes the measured velocity signal and causes the measured velocity signal to change when a defect is being crossed (no TES signal 207 is being produced) using servo system parameters as will become apparent. This smoothing provides a continuous analog-type velocity signal throughout a seek operation even with significant defects. Such smoothing includes modeling the mechanical dynamic characteristics of the fine actuator and the relative-position error sensor 56. When the track-crossing frequency (high radial speed) during a SEEK exceeds a predetermined threshold, digital velocity circuits 330 are employed for generating the measured velocity signal on line 133. Such circuits may be the circuits shown in the co-pending application, supra; while at speeds below the track-crossing frequency threshold, the TES signal on line 63 is employed for measuring the radial velocity. The FIG. 11-illustrated circuits selectively modify the measured velocity signal or the TES signal on line 63 to supply a continuous analog-type velocity-indicating signal on line 133.

In FIG. 11, summation circuit 400 receives three inputs to be summed for providing the measured velocity signal on line 133. A first input signal is received from the fine actuator drive signal on line 57D (the drive signal without the radial runout compensation effect provided over line 118 (FIG. 3). The fine actuator 46 drive current on line 57D is modified in circuit 401 by a model of the force constant of fine actuator 46. A second input is the RPE signal on line 58E that is modified by circuits 402. In circuits 402, the RPE signal is modified by a model of the spring constant and viscous damping constant of the fine actuator 46. The RPE effect on summation circuit 400 is to subtract or counteract the other two inputs. In a practical embodiment, the portions in circuits 402, respectively modelling the spring constant and the viscous damping constant, may result in separate summation inputs to the summation circuit 400. The third input to summation circuit 400 on line 403 provides a timed velocity recalibration input from either velocity circuits 330 or from the line 63 TES signal 207, depending upon the track-crossing frequency, as will become apparent. The RPE error signal from circuit 402 is subtracted from the sum of the first and third inputs, respectively, from circuits 401 and 403. Summation circuit 400 supplies its sum signal through compensation circuit 404 which modifies the summation circuit by an inverse of a model of the fine actuator 46 mass value. Compensation circuit 404 supplies its compensated signal through low-pass filter LP 405 to line 133.

The actual measured velocity calibration change of the smoothed measured velocity signal on line 133 is timed to coincide with the ends of respective velocity-measuring periods. Switch 410 times the modification of the estimated measured velocity throughout the seek operation. The timing is controlled by circuit 411 which holds electronic switch 410 closed for a predetermined period, such as by a monostable multivibrator indicated in circuit 411 by the word "HOLD". Circuit 411 has four inputs into two AND function circuit portions A1 and A2. Circuit A1 times the switch 410 whenever the digital velocity-measuring circuit 330 is being implemented; i.e., above the track-crossing frequency threshold. Below the track-crossing frequency threshold, when the TES signal on line 63 is used for generating the velocity signal, AND circuit A2 controls the timing of switch 410. An OR circuit "OR" passes the outputs of AND circuits A1 and A2 in a logic OR manner for actuating the HOLD portion of circuit 411.

Circuit 411 is controlled by comparator circuit 412. Comparator circuit 412 receives the reference velocity signal on line 132 (FIG. 3) for comparison with a track-crossing frequency threshold value received over line 413. Since the threshold signal on line 413 is a constant, it can be provided by a voltage divider or other suitable voltage or current source. Comparator circuit 412 is of the switching type such that when the reference velocity on line 132 is less than the threshold signal on line 413, an actuating signal is supplied by comparator circuit 412 only over line 414; when the reference velocity signal on line 132 exceeds the threshold signal on 413, then an actuating signal is supplied over line 415. The reference velocity signal on line 132 is representative of the track-crossing frequency. The actuating signal on line 414 is supplied to AND circuit A2 for passing the track-crossing signals received from line 63 to actuate the "hold" portion of circuit 411 for closing switch 410. AND circuit A1 is enabled to pass the end of measuring period signal on line 331 by the line 415 signal. The line 331 signal is delayed by circuit 416 to compensate for circuit delays. When the digital velocity circuit 330 is providing the measured velocity signal on line 332, AND circuit A1 is actuated at the end of each of the measuring periods for timing the closure of calibrating switch 410.

Analog summation circuit 420 supplies the calibrate signal through switch 410 as the third summation input on line 403 for analog summation circuit 400. Line 421 couples the output of compensation circuit 404 as a subtractive input into summation circuit 420. The actual measured signals are supplied to summation circuit 420 respectively through either switch 422 or 425. Switch 422 is closed by the line 415 actuating signal for passing the digital velocity measured signal on line 332 as a positive summation signal to summation circuit 420. Therefore, when the seek speed or velocity is greater than the threshold on line 413, the correction signal to summation circuit 400 is the difference between the measured signal on line 332 from the digital measuring circuit and the feedback signal on line 421.

When the seek speed is below the threshold value on line 413, the velocity measurement is as follows: The TES signal 207 on line 63 supplied though gain control block circuit 426 goes to switch 427, thence to sample and hold circuit S&H 428. Sample and hold circuit 428 receives the input TES pulses on line 161 at each TES signal 207 zero crossing (two zero crossings per track crossing). Electronic switch 425 remains closed when comparator 412 supplies the actuating signal on line 414. Switch 410 supplies the timing control for the calibration of the measured velocity signal on line 133.

Polarity corrections have to be provided for the velocity signal calculated from the line 63 TES signal 207. Referring next to FIG. 6, a portion of the grooved medium 30 is shown with track center lines 206 being in the grooves with no tracks being on the mesas 215 intermediate the grooves. Tracking error signal 207 (TES signal on line 63) is shown in spatial relationship to the grooved media 30. An actual track-crossing signal is represented by the vertical line 220 and the zero crossings of TES signal 207 on the mesas are represented by numeral 221. Depending on the relative direction of motion with respect to the groove or track crossings 206, the polarity of the signal supplied to switch 427 varies. Accordingly, the actual relative direction of the beam 47 as it crosses the tracks 206 have to be polarity reversed. To achieve this, the output signal of gain-adjusting circuit 426 is supplied over line 435 to direction circuit 436 which receives a direction indicating signal over line 437. The direction indicating signal on line 437 is the actual direction as determined by the comparison of the quadrature signal and the TES signal (FIG. 9). Circuit 436 basically is a phase compare such that the control of switch 427 will always provide a properly-phased signal to circuit S&H 428. Line 439 causes a polarity inverted signal from circuit 426 for supplying an inverted signal to terminal 440 of switch 427. The operation of the circuit is such that when the beam is relatively moving across the tracks as seen in FIG. 6 from left to right, all signal crossings will be positive. That is, the signal crossings at points 221 will be polarity inverted rather to have the same polarity velocity-indicating signal in S&H 428. On the other hand, when the beam movement is from right to left, the indicating signals are reversed.

While the invention has been particularly shown and described with reference to preferred embodiment thereof, it will be understood by those skilled in the art that various changes in form and details may be made therein without departing from the spirit and scope of the invention.

What is claimed is:

1. In a machine-effected method of operating a positioning mechanism having relatively movable first and second members, one of said members having closely-spaced-apart, position-indicating-machine-sensible indicia and another of said members having means for sensing said indicia and for generating signals indicative of the sensed indicia, motive means coupled to said members for relatively moving same;

the improvement, including the machine-executed steps of:

actuating said motive means to relatively move said members at varying rates of speed;

during said relative movement, sensing said indicia by said sensing means and generating indicia signals for indicating said sensed indicia;

slaving a timed electrical circuit to said indicia signals for generating timed signals;

during a first predetermined portion of said relative movement of said members, applying only said indicia signals to said motive means for actuating the motive means to relatively move said members; and during a second predetermined portion of said relative movement, applying only said timed signals to said motive means for actuating the motive means to relatively move said members.

2. In the machine-effected method set forth in claim 1, the machine-executed steps of:

during said relative movement, sensing for and electrically indicating the relative speed of said members;

establishing a reference speed, comparing said electrically-indicated speed with said reference speed for indicating the relative magnitudes of said electrically-indicated speed and said reference speed as a first and second speed signals respectively corresponding to the electrically-indicated speed being not greater or greater than said reference speed; and said first speed signal indicating said first portion and second speed signal indicating said second portion such that the indicia signals and the timed signals are applied to the motive means in said first and second portions wherein the second portion includes relative speeds greater than said reference speed.

3. In the machine-effected method set forth in claim 2, the machine-executed steps of:
   establishing and storing a speed profile indicating a desired speed throughout said relative movement;
   creating a detection window having a predetermined time duration for detecting said indicia; and
   altering the detection window time period durations in an inverse ratio of the speed of said speed profile.

4. In the machine-effected method set forth in claim 3, the machine-executed steps of:
   during said second predetermined portion, examining said speed profile for actuating the timed electrical circuit for altering the frequency of the time signal in a linear direct proportion to said speed profile.

5. In the machine-effect method set forth in claim 4, the machine-executed steps of:
   selecting said desired speed from the speed profile and establishing a pass frequency band for the indicia signals such that the pass band frequencies are in a predetermined direct ration with said desired speed; and
   filtering said indicia signals to lie only in said pass band such that any indicia signals outside the pass band are blocked and therefore not within said detection time periods.

6. In the machine-effected method set forth in claim 5, the machine-executed steps of:
   modelling the physical dynamics of said another one of the members and changing the electrically-indicated speed in accordance with said modelling.

7. In the machine-effected method set forth in claim 5, wherein said first member is a transducer-carrying member movably mounted on a frame for reciprocating motions along a first lineal path, said second member is a record-member having record tracks extending transversely to said first lineal path and a frame for movably mounting the members for movements along said record tracks for enabling said sensing means to scan the respective record tracks, said record-member having grooves and mesas extending along said tracks, said sensing means including means for shining a light beam onto the record member and having detection means having four rectangular arranged light sensing elements oriented such that one axis of the rectangle enclosing the four elements is aligned with the extend of the record-member tracks and includes means for generating the sensed signals by combining the signals from the elements on the respective sides of said axis and differencing the signals from the elements on the opposite sides of the axis and generating a quad signal by summing signals from all of the elements;
   further including the machine-executed steps of:
   counting the indicia signals such that an effective count of two represents transversal of one of said record tracks; and
   each time said quad signal amplitude indicates a current track crossing adjusting the count such that the count is even each time the quad signal signifies the beam impinges on a track.

8. In a machine-effected method of relatively moving first and second members, one of the members having closely spaced-apart, position-indicating, machine-sensible indicia and another of said members having means for sensing said indicia and producing indicia signals, motive means coupled to said members for relatively moving same;
   the improvement including the machine-executed steps of:
   during said relative movement, analyzing the indicia signals for electrically indicating the relative speed of movement as a sensed relative speed;
   slaving a timed circuit to said indicia signals for generating timed signals;
   establishing a reference speed indication;
   comparing said sensed relative speed with a reference speed indication and indicating a first portion of said relative movement when the sensed relative speed is less than said reference speed and indicating a second portion of said relative movement when the indicated relative speed is greater than said indicated reference speed; and
   supplying said indicia signals to said motive means only during said first portion and said timed signals to said motive means only during said second portion for actuating said motive means to control relative motion of said members during said relative movement.

9. In the method set forth in claim 8, the machine-executed steps of:
   establishing and storing a speed profile for said relative movement which indicates desired speed as a function of relative displacement during said relative movement;
   indicating relative displacement of said members during said relative movement;
   generating detection time periods for said indicia signals during said relative movement which varies in duration in an inverse ratio to one of the indicated speeds such that the detection time periods indicate the time of sensing for said indicia; and
   supplying only those indicia signals occurring during said detection times to said motive means.

10. In a positioning system having first and second relatively moveable members, said first member being a record member having elongated tracks respectively identified by a plurality of substantially-parallel spaced-apart grooves in the record member, an optical transducer on the second member in optical communication with the record member and its grooves, said members being mounted on a frame for first and second relative movements in first and second directions respectively along and transverse to said tracks, tracking circuit means operatively coupled to the transducer for receiving an indicia signal indicative of the current relative position of the transducer to one of said grooves along said second direction, motive means coupled to said members for relatively moving same along said second direction for moving said transducer from one record track on the record member to a second record track in the record member displaced from the one record track along said second direction;
   the improvement including, in combination:
   a timed electrical circuit electrically connected to said transducer means for receiving said indicia signals and being slaved to said indicia signals for generating timed signals;
   selection means for indicating first and second predetermined portions of said relative movements in said second direction;
   coupling means connected to said motive means, said timed electrical circuit, said transducer and said selection means for responding to said indications of the first and second portions to respectively supply said indicia signals and said timed signals to said motive means only during said respective first and second portions.

11. The invention set forth in claim 10, further including, in combination;
- detection window generating means in said selection means;
- distance means coupled to said transducer for receiving said indicia signals and generating an indication of relative position along said second direction of said members during said relative movement;
- speed profile means connected to said distance means for responding to said indication of relative distance to generate a desired speed value;
- said speed profile means being coupled to said distance means for receiving said indication of relative position and generating therefrom an indication of desired speed of relative movement between said members;
- said window generating means being coupled to said speed profile means and to said transducer for respectively receiving said desired speed indication and said indicia signals for generating a detection period indication during which occurrence of said indicia signals may be detected such that the detection period occurs during the time the transducer is traversing said tracks during said relative movement in the second direction;
- signal detection means in said window generating means jointly responsive to said detection window indication and to said indicia signals to indicate whether or not an indicia signal occurred during a detection window; and
- said signal detection means being operatively connected to said coupling means to supply an indication of said first portion whenever said detection indicates that an indicia signal occurred during the detection window and an indication of said second portion whenever said detection indicates an indicia signal did not occur during said detection window.

12. In the invention set forth in claim 11, further including, in combination:
- speed means for indicating a reference speed value;
- control means in said window generating means coupled to said speed profile means for receiving said desired speed indication and coupled to said speed means for receiving said indicated reference speed value for comparing said speed profile desired speed value with said reference speed value to supply a first indication that said reference speed value is greater than said desired speed value and a second indication that said desired value is higher than said than said reference speed value;
- said selection means being connected to said control means for responding to the first and second indications to indicate said first and second portions, respectively.

13. In the invention set forth in claim 11, further including in combination:
- frequency band-pass means electrically interposed between said transducer and said window detection means and coupled to said speed profile means for responding to said speed profile indication to change the pass band in a direct ratio to the indicated speed.

14. In the invention set forth in claim 11, further including in combination:
- distance means electrically connected to said transducer for receiving said indicia signals and counting same at two counts per track crossing for indicating relative displacement of said members during said relative movement in said second direction;
- amplitude indicating means electrically connected to said transducer for receiving a quad signal therefrom which is in phase quadrature to said indicia signal and having first and second predetermined signal states;
- verify means electrically and logically interposed between said distance means and said amplitude indicating means for receiving said count and said quad signal, and means in the verify means responsive to said count being odd and said quad signal is in said first signal state to decrement the count in the distance means by unity and being responsive to said quad signal being in said second signal state not to alter the count.

15. In the invention set forth in claim 14, further including, in combination:
- multiple means in said signal detection means responsive to said signal detection means receiving a plurality of said indicia signals during a predetermined one of said detection periods to indicate said second portion; and
- said selection means being connected to said multiple means for responding to said second portion indication to actuate the coupling means to supply said timed signals to said motive means.

* * * * *